United States Patent
Chung et al.

(10) Patent No.: US 6,310,841 B1
(45) Date of Patent: Oct. 30, 2001

(54) OPTICAL PICKUP FOR NARROW TRACK OPTICAL DISCS

(75) Inventors: Chong-Sam Chung, Sungnam; Kun-Ho Cho, Suwon, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/210,790

(22) Filed: Dec. 15, 1998

(30) Foreign Application Priority Data

Mar. 17, 1998 (KR) .................................................. 98-9119

(51) Int. Cl.⁷ ...................................................... G11B 7/18
(52) U.S. Cl. .................. 369/44.24; 369/118; 369/112.01
(58) Field of Search ............................... 369/44.24, 44.25, 369/44.23, 44.28, 44.37, 44.32, 44.12, 112, 109, 118, 112.01, 112.02, 112.23

(56) References Cited

U.S. PATENT DOCUMENTS

| | | |
|---|---|---|
| 4,171,879 | 10/1979 | Bricot et al. . |
| 4,742,219 * | 5/1988 | Ando .............................. 369/44.23 X |
| 5,072,437 | 12/1991 | Chikuma ............................ 369/118 |
| 5,742,437 | 4/1998 | Eguchi et al. ...................... 359/739 |
| 6,009,066 * | 12/1999 | Yoo et al. .......................... 369/112.1 |

FOREIGN PATENT DOCUMENTS

| | | |
|---|---|---|
| 0 532 175 A1 | 8/1992 | (EP) . |
| 0 737 964 A1 | 10/1996 | (EP) . |
| 2 310 310 | 8/1997 | (GB) . |
| 05-072497 | 3/1993 | (JP) . |
| 07-287860 | 10/1995 | (JP) . |
| 09-050640 | 2/1997 | (JP) . |
| 09-063106 | 3/1997 | (JP) . |
| 09-219035 | 8/1997 | (JP) . |
| 09-237431 | 9/1997 | (JP) . |
| 09-245366 | 9/1997 | (JP) . |
| 10-302294 | 11/1998 | (JP) . |
| WO 96/27143 | 9/1996 | (WO) . |

* cited by examiner

Primary Examiner—Muhammad Edun
(74) Attorney, Agent, or Firm—Staas & Halsey LLP

(57) ABSTRACT

An optical disc can increase an information storage capacity by reducing the track width of the optical disc. An optical pickup for a narrow track optical disc includes an optical shielding portion having a desired light intensity distribution with respect to a target track and the tracks adjacent to the target track on the optical disc. The optical shielding portion is disposed on the optical path between the light source and the optical disc and shields part of the light beam proceeding toward the optical disc, to provide a light intensity distribution such that only the beam spot focused on the target track is used to detect information stored in the target track. Thus, the beam spot focused on the target track of the optical disc has track crosstalk having a magnitude by which information can be read from the target track. The optical pickup can provide an excellent performance even in the case that the optical pickup is adapted in a high-definition DVD to be commercialized in the future.

17 Claims, 5 Drawing Sheets

OPTICAL PICKUP FOR NARROW TRACK OPTICAL DISCS

CROSS-REFERENCE TO RELATED APPLICATIONS

This application claims the benefit of Korean Application No. 98-9119, filed Mar. 17, 1998, in the Korean Patent Office, the disclosure of which is incorporated herein by reference.

BACKGROUND OF THE INVENTION

1. Field of the Invention

The present invention relates to an optical pickup for an optical data storage medium having narrow tracks. More particularly, the invention relates to an optical pickup which can read information stored in an optical data storage medium, even when a signal rate in the optical data storage medium, i.e., the distance between a target pit track and an adjacent pit track, is shortened.

2. Description of the Related Art

The size of a beam spot of a light beam incident on an optical data storage medium is directly related to the size of a mark or pit recorded on the optical data storage medium. Therefore, it is necessary to produce a minimum possible size of the beam spot, in order to increase a data storage capacity of the optical data storage medium. To produce a small beam spot, an optical data storage system using a short-wavelength light source and an objective lens having a large numerical aperture (NA) is under development. Together with the development of the optical data storage system, a method of increasing a data storage capacity in an optical data storage medium by diminishing a size of the pit which is a minimum physical recording unit, is also under development. As a result, optical data storage media have been developed from a compact disc (CD) using an infrared light source of 780 nm wavelength and an objective lens of 0.45 NA to a digital versatile disc (DVD) using an infrared light source of 650nm wavelength and an objective lens of 0.6 NA. Also, a track pitch is greatly reduced together with a change in the specification from CD to DVD.

To increase the storage capacity in the near future, an optical data storage medium having a shorter track pitch should be used. In this case, a reproduced signal severely deteriorates due to a signal interference between adjacent tracks. In an optical data storage medium, a track crosstalk is used for measuring a degree that a signal recorded on a target track deteriorates due to a signal stored in an adjacent track. In case of a disc of a ROM (read only memory) type, a required track crosstalk is a value of −30 dB or less. A conventional optical pickup which meets this requirement will be described with reference to FIG. 1.

The optical pickup shown in FIG. 1 uses three light beams in order to reproduce information stored in an optical disc 6. The optical pickup includes a light source 1 which is, e.g., made of a laser diode, a diffraction grating 2, a beam splitter 3, a reflective mirror 4, an objective lens 5, a light reception lens 7 and an optical detector 8. The diffraction grating 2 diffracts a light beam emitted from the light source 1 to divide the emitted light beam into three light beams. The three light beams are reflected by the beam splitter 3 toward the reflective mirror 4. The reflective mirror 4 reflects the three incoming light beams toward the objective lens 5. The objective lens 5 focuses the three incoming light beams on an information recording surface of the optical disc 6. As a result, the three light beams are focused on neighboring three tracks as three beam spots (a left-side beam spot, a main beam spot and a right-side beam spot). FIG. 2 shows the main beam spot and left-side and right-side beam spots formed in a target track and two (left-side and right-side) tracks adjacent to the target track, respectively, as circular shapes. In FIG. 2, the target track, the left-side track and the right-side track are determined based on the proceeding direction of the optical pickup of FIG. 1.

The light beams reflected from the neighboring three tracks pass through the objective lens 5, are reflected by the reflective mirror 4, and then proceed toward the beam splitter 3. The beam splitter 3 enables the three light beams reflected from the reflective mirror 4 to proceed toward the light reception lens 7. The light reception lens 7 focuses the three light beams incident from the beam splitter 3 on the optical detector 8. The optical detector 8 includes three photodiodes individually corresponding to the three light beams. The beam spots formed on the optical surfaces of the three photodiodes are shown in FIG. 3. In FIG. 3, the main beam spot formed in the target track is detected in a first photodiode, the right-side spot formed in the right-side track with respect to the target track is detected in a second photodiode, and the left-side spot formed in the left-side track with respect to the target track is detected in a third photodiode.

An electronics circuit (not shown) connected to the optical detector 8 uses electrical signals corresponding to the beam spots formed in the three photodiodes to detect signals of the adjacent tracks imposed on a signal read from the target track. Thus, the electronics circuit removes the signals imposed by the adjacent tracks from the read signal of the target track, so that the information stored in the target track can accurately be obtained.

However, the conventional system divides a light beam incident to an objective lens into three light beams, in order to obtain signals from two tracks adjacent to a target track. Therefore, an intensity of the light beam which is used for acquisition of information from a target track is reduced. Consequently, a light use efficiency is lowered. Also, an optical axis of the diffraction grating 2 must be accurately adjusted in order to accurately focus the three light beams divided by the diffraction grating 2 on the neighboring three tracks. Further, a separate electronics circuit as described above is required to remove the signals imposed from the adjacent two tracks from the read signal from the target track.

SUMMARY OF THE INVENTION

To solve the above problems, it is an object of the present invention to provide an optical pickup which prevents a signal read from a target track of an optical disc from being interfered with signals read from adjacent tracks. The optical pickup can reduce a track crosstalk generated by the adjacent tracks. Thus, a circuit for processing a signal detected by the optical pickup is simplified and information can be accurately read from the target track of the optical disc.

Additional objects and advantages of the invention will be set forth in part in the description which follows and, in part, will be obvious from the description, or may be learned by practice of the invention.

To accomplish the above and other objects of the present invention, there is provided an optical pickup for recording and/or reproducing data with respect to an optical disc, the optical pickup including a light source; an objective lens to focus an incoming light beam on an information recording surface of the optical disc as a beam spot; an optical detector; an optical path change unit to transmit the light beam incoming from the light source to the objective lens and transmitting the light beam incoming from the objective lens to the optical detector; and an optical shielding portion positioned on the optical path between the light source and the optical disc, to shield part of the light beam proceeding toward the optical disc from the light source, in such a manner that light intensities on the tracks adjacent to a target track are substantially zero in the case that the light beam is focused on the target track of the information recording surface of the optical disc.

The optical shielding portion shields part of the light beam proceeding toward the optical disc from the light source, so that the beam spot focused on the target track has a light intensity distribution in which the light intensity on pits of the target track has a maximum value and the light intensities on pits of the adjacent tracks just to the target track has a minimum value.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
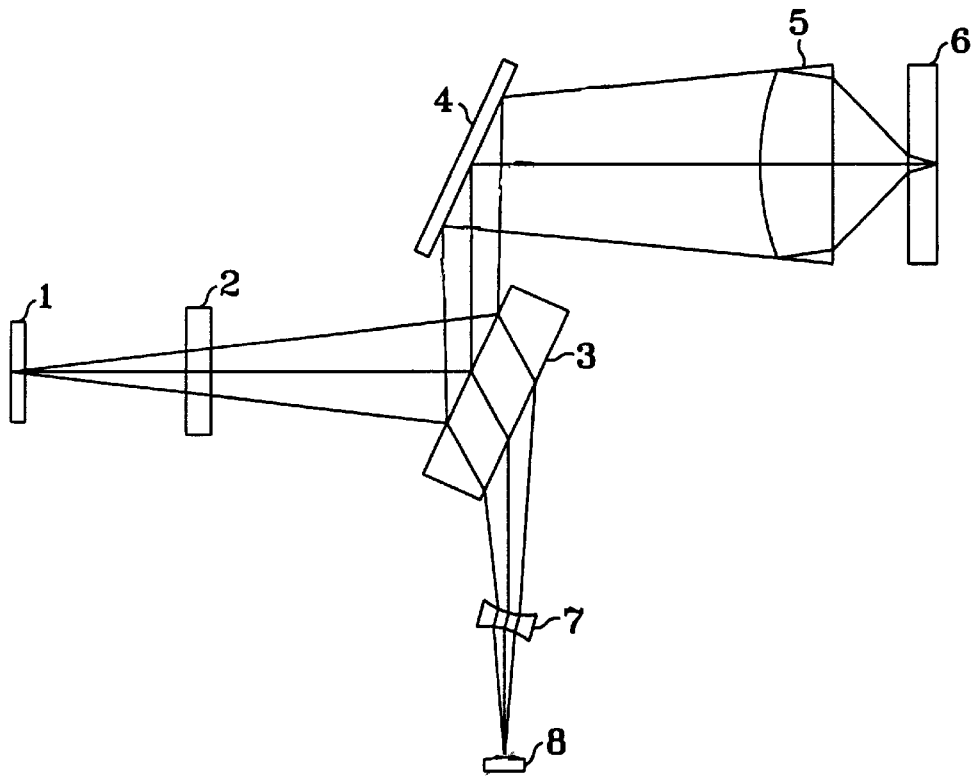
FIG. 1 shows an optical system of a conventional optical pickup.
Figure 2:
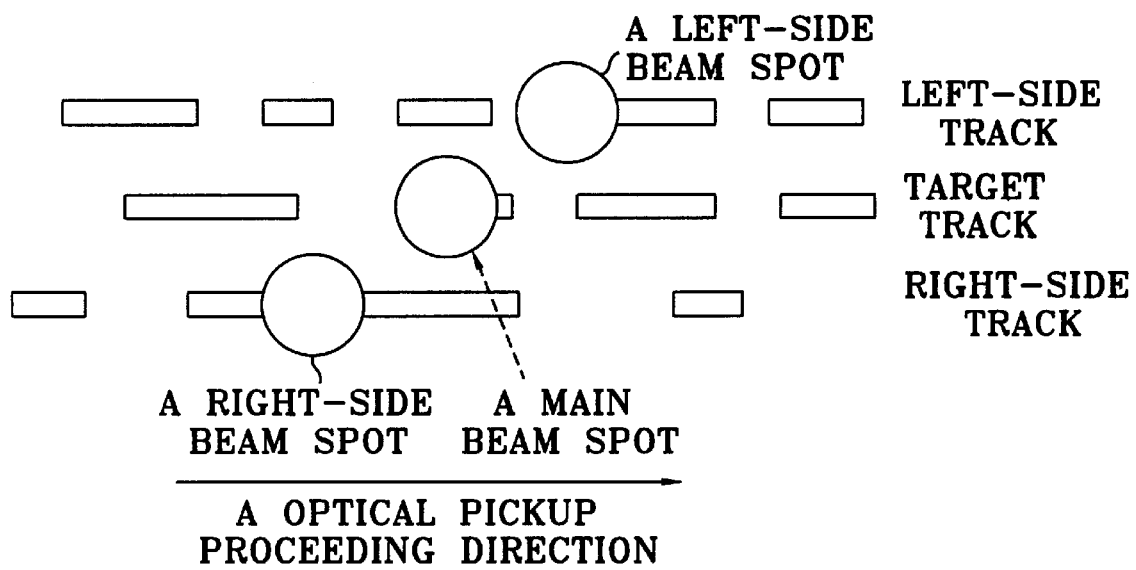
FIG. 2 shows beam spots focused on the tracks of an optical disc by an optical pickup shown in FIG. 1.
Figure 3:
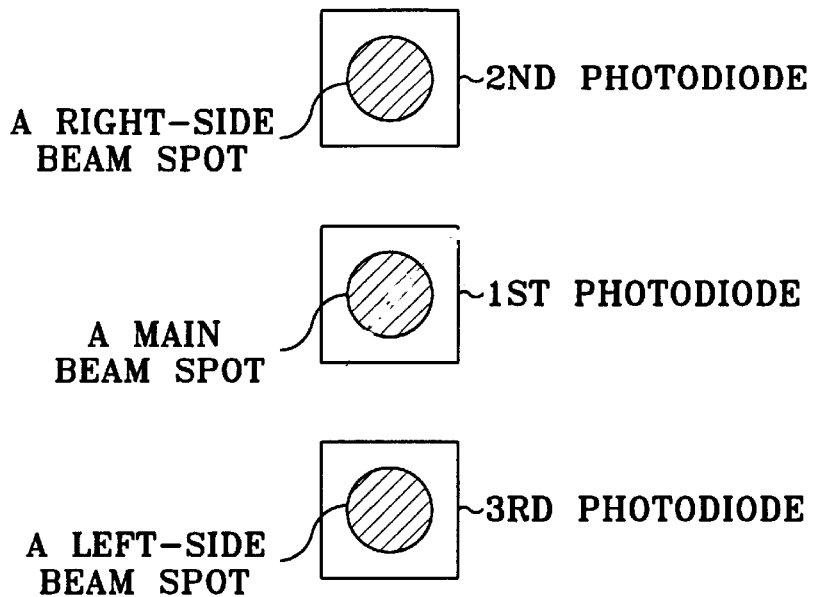
FIG. 3 shows beam spots formed on the optical surfaces of the photodiodes of the optical pickup shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

An optical pickup according to the present invention shields a part of a light beam emitted from a light source prior to focusing the light beam on an optical storage medium. The light beam shielding performed by the optical pickup of the present invention allows a light intensity distribution which enables the reading of information stored in a target track of an optical disc without using signals read from the tracks of the optical disc adjacent to the target track, with respect to the target track and the adjacent tracks. The width and position of the optical shielding portion which is used for shielding the light beam are determined based on whether a signal read from the target track has a track crosstalk which allows information stored in the target track to be detected. Thus, as long as this requirement is met, the optical shielding portion may be of various shapes, such as a concentric rings, a rectangular strip, etc.

Figure 4:
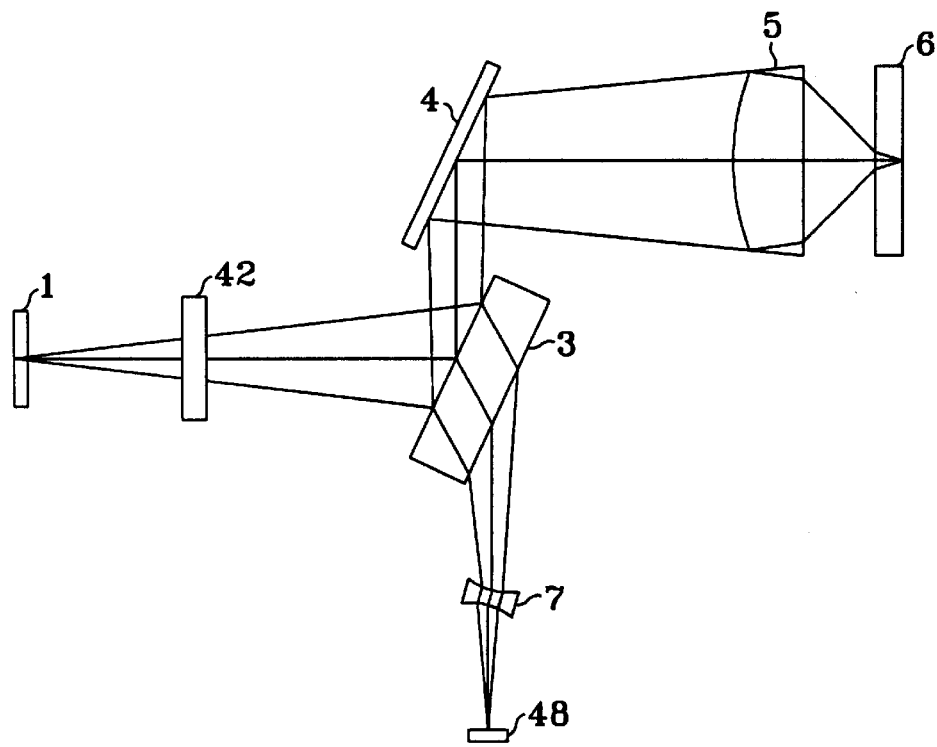
FIG. 4 shows an optical system of an optical pickup according to a first embodiment of the present invention.

FIG. 4 shows an optical system of an optical pickup according to a first embodiment of the present invention which reads information from a narrow track optical disc. The optical pickup shown in FIG. 4 includes a light source 1, a beam splitter 3, a reflective mirror 4, an objective lens 5 and a light reception lens 7, each of which has the same reference numeral and optical function as that shown in FIG. 1. In addition, the optical pickup of FIG. 4 includes an optical shielding plate 42 and an optical detector 48 which embody the present invention.

Figure 5:
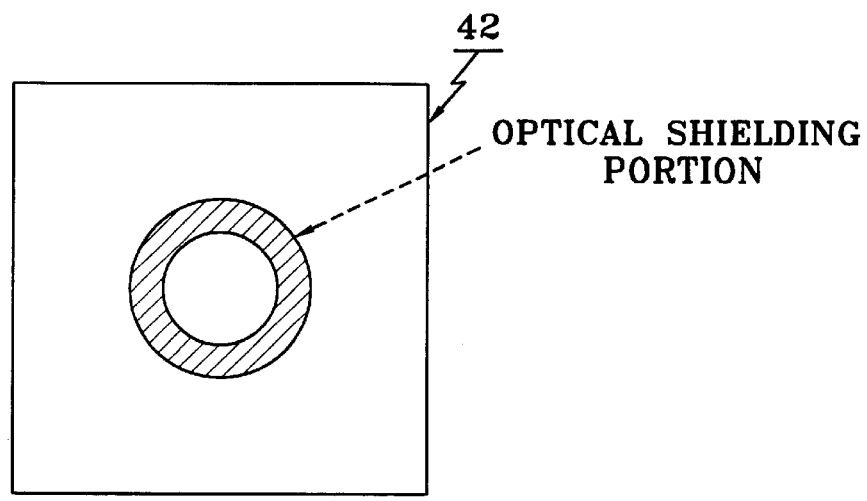
FIG. 5 is a view for explaining an optical shielding plate used in the optical pickup shown in FIG. 4.

The optical shielding plate 42 shown in FIG. 4 is positioned in an optical path between the light source 1 and the beam splitter 3, and includes an optical shielding portion whose width and position are determined by an optical disc 6 from which information is read using the optical pickup of FIG. 4. FIG. 5 shows an optical shielding portion formed in the optical shielding plate 42 shown in FIG. 4. In the first embodiment, the optical shielding portion has a concentric ring shape in which two circles have an optical center of the optical shielding plate 42 as their centers. In the case that the objective lens 5 has an aperture corresponding to the NA of 0.6 and the track pitch of the optical disc 6 is 0.4 $\mu$m, the width and position of the optical shielding portion formed in the optical shielding plate 42 are determined in correspondence to the NA ranging from 0.22 to 0.26 in the objective lens 5. The optical shielding portion is formed by coating a coating material having a total reflection characteristic at a desired position on a transparent substrate such as a glass plate. Thus, when the light beam emitted from the light source 1 is incident to the optical shielding plate 42, the optical shielding portion in the optical shielding plate 42 totally reflects the incident light beam and the other portions of the optical shielding plate except for the optical shielding portion transmit the incident light beam therethrough. As a result, differently from the light beam reflected from the target track of the optical disc 6 by the optical pickup shown in FIG. 1, the light beam reflected from a target track of the optical disc 6 is slightly subject to an interference due to the tracks adjacent to the target track. Therefore, the optical pickup of FIG. 4 can obtain a signal having much less track crosstalk compared with the FIG. 1 optical pickup. More specifically, the light beam reflected from the target track by the FIG. 4 optical pickup enables acquisition of the information stored in the optical disc 6 from a single light beam reflected from the target track. The optical detector 48 in the FIG. 4 optical pickup should be fabricated so that a single light beam is detected by the divided photodiodes. This is because the detected light beam should be used for tracking and focusing. The optical detector 8 described with reference to FIG. 1 can be used instead of the optical detector 48.

Prior to describing the FIG. 4 optical pickup system having the above configuration, a configuration in which an optical shielding portion is formed on an optical surface of an objective lens according to a second embodiment of the present invention will be described with reference to FIG. 6.

Figure 6:
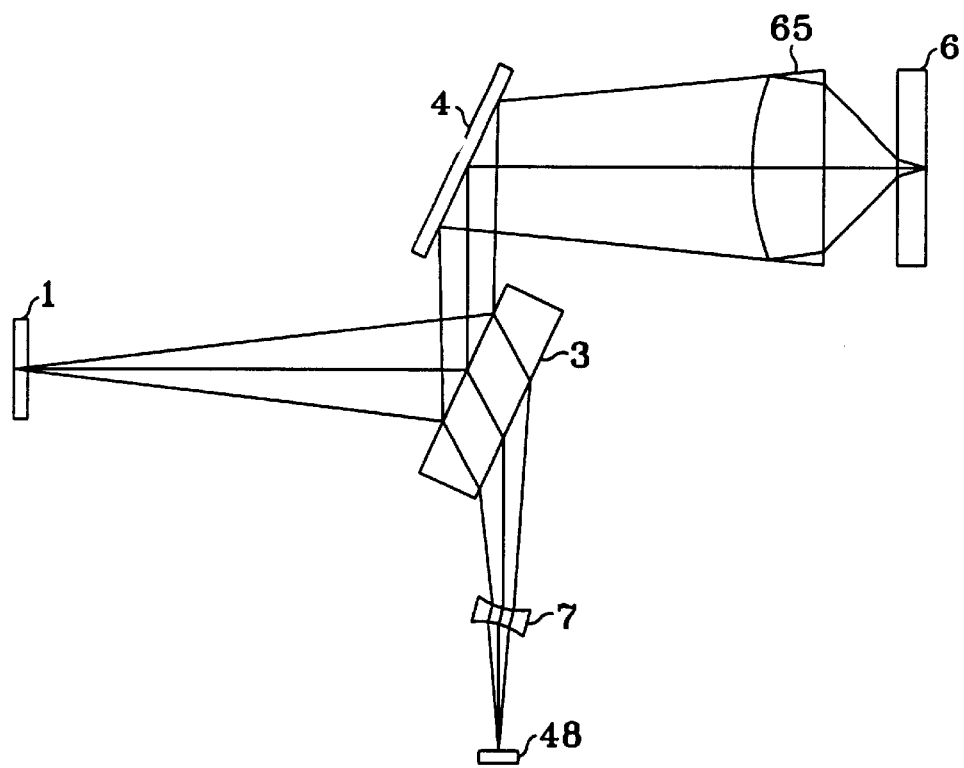
FIG. 6 shows an optical system of an optical pickup according to a second embodiment of the present invention.

An optical pickup according to the second embodiment of the present invention shown in FIG. 6 does not use an optical shielding plate 42 shown in FIG. 4. Instead, the optical pickup of FIG. 6 includes an objective lens 65 in which an optical shielding portion having a total reflection characteristic is formed on an optical surface thereof. The optical elements constituting the optical pickup of FIG. 6 which have the same reference numerals have the same optical functions as those of the optical pickup of FIG. 1 or 4. Therefore, the detailed description thereof will be omitted.

Figure 7:
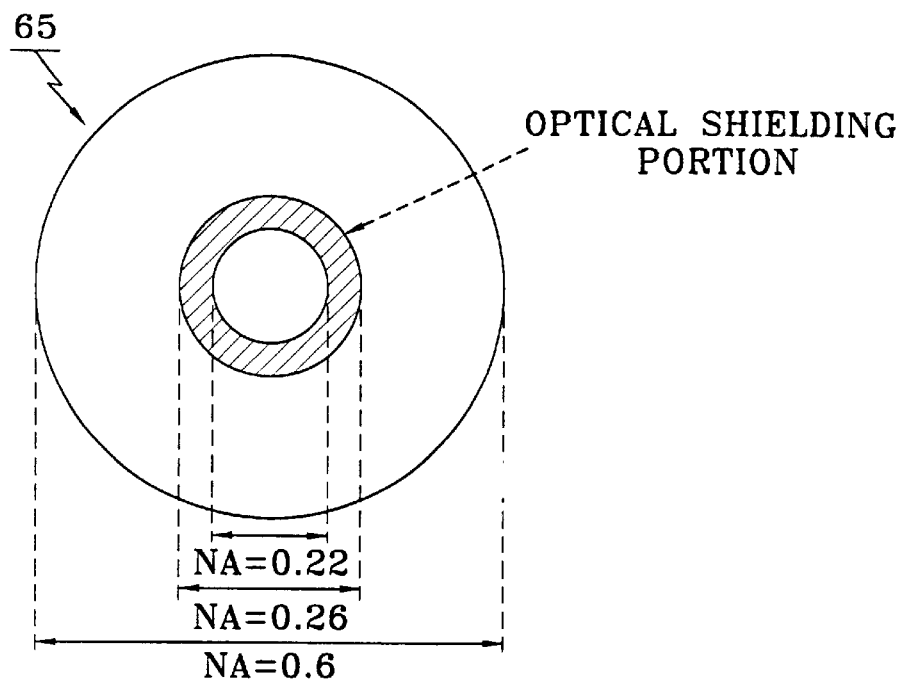
FIG. 7 is a view for explaining an optical shielding portion formed on an optical surface of an objective lens shown in FIG. 6.

In the second embodiment, the optical shielding portion is formed on the optical surface of the objective lens 65 which is positioned on the opposite side to the optical surface facing the optical disc 6. FIG. 7 shows an objective lens 65 in which the optical shielding portion is formed. In FIG. 7, the optical shielding portion depicted as a hatched portion has a concentric ring shape and is formed on the optical surface of the objective lens 65 corresponding to the range of the numerical aperture from 0.22 to 0.26. Alternatively, the optical shielding portion can be formed on the optical surface of the objective lens 65 which faces the optical disc 6. In the objective lens 65 having the optical shielding portion, part of the light beam incident to the objective lens 65 is passed through, and the other part of the light beam is shielded by a total reflection of the optical shielding portion.

Figure 8:
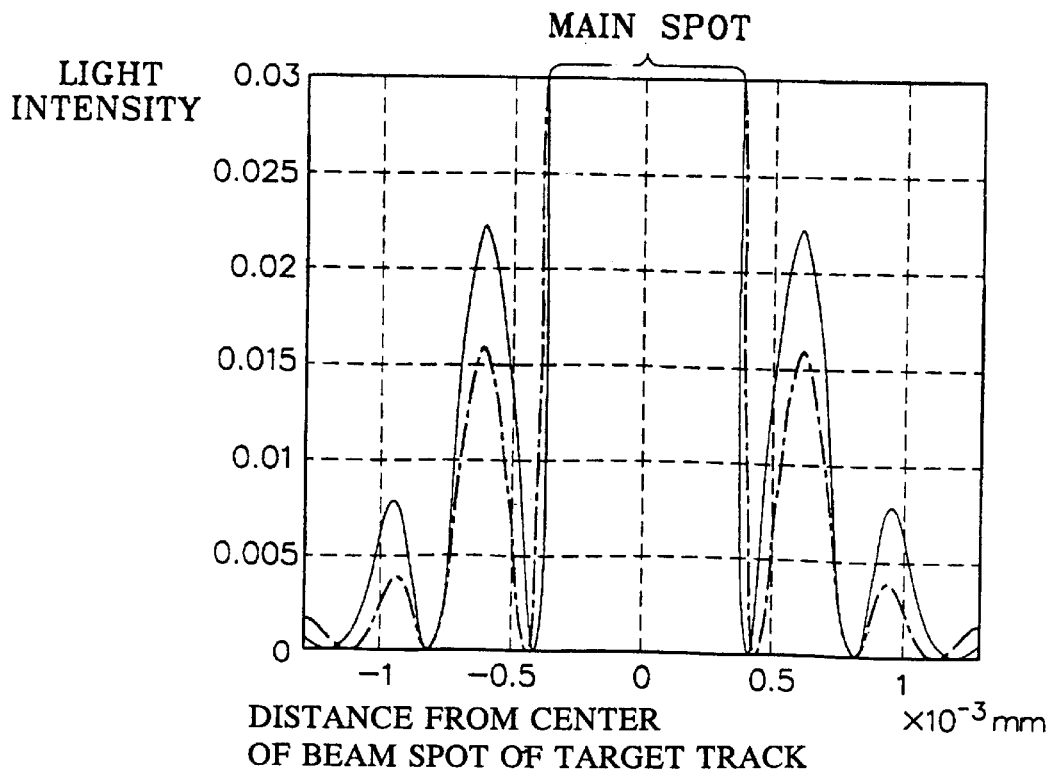
FIG. 8 is a graphical view for explaining a light intensity distribution of the beam spot changed by partial shielding of a light beam incident on a target track according to the first and second embodiments of the present invention.

FIG. 8 shows a light intensity distribution of the beam spot focused on a target track of the optical disc 6. Particularly, FIG. 8 shows a light intensity distribution when a specification for a high density optical disc using a blue laser diode, for example, when an optical disc having a track pitch of 0.4 $\mu$m and a minimum pit length of 0.23 $\mu$m, a light source having a wavelength of 420 nm and an objective lens having a numerical aperture of 0.6 are used. The light intensity distribution shown in FIG. 8 is only the portion of the light intensity that is less than 3% of the maximum light intensity possessed by the beam spot detected through a detector surface when the center of the main spot coincides with the center of a pit on a target track. In FIG. 8, the center of the beam spot coincides with the origin of a horizontal axis and the distance from the origin is expressed as a unit of $\mu$m. A vertical axis indicates a light intensity corresponding to the position having a distance from the center of the beam spot. A light intensity distribution curve indicated as a solid line represents a light intensity distribution formed by a beam spot focused by the optical pickup of FIG. 4 or 6, and a light intensity distribution curve indicated as a broken line represents a light intensity distribution formed by a beam spot when the optical pickup of FIG. 4 or 6 does not have an optical shielding portion.

The position where a light intensity of the optical pickup of FIG. 4 or 6 becomes initially zero is distant by approximately 0.4 $\mu$m from the center of the beam spot as shown in FIG. 8. In other words, when using the optical pickup having the optical shielding portion, the position where the light intensity becomes zero coincides with the center of a pit on the track adjacent to the target track. On the contrary, when the optical pickup does not have an optical shielding portion, the position where the light intensity becomes zero is distant by slightly more than 0.4 $\mu$m from the center of the pit on the target track. Therefore, in the case that the optical disc 6 has a track pitch of 0.4 $\mu$m and a beam spot is accurately focused on the center position of the pit on the target track, the beam intensity becomes substantially zero at the center position of the pit on the adjacent track. As a result, according to the embodiments of the present invention, a light use efficiency not less than 90% is provided.

Figure 9:
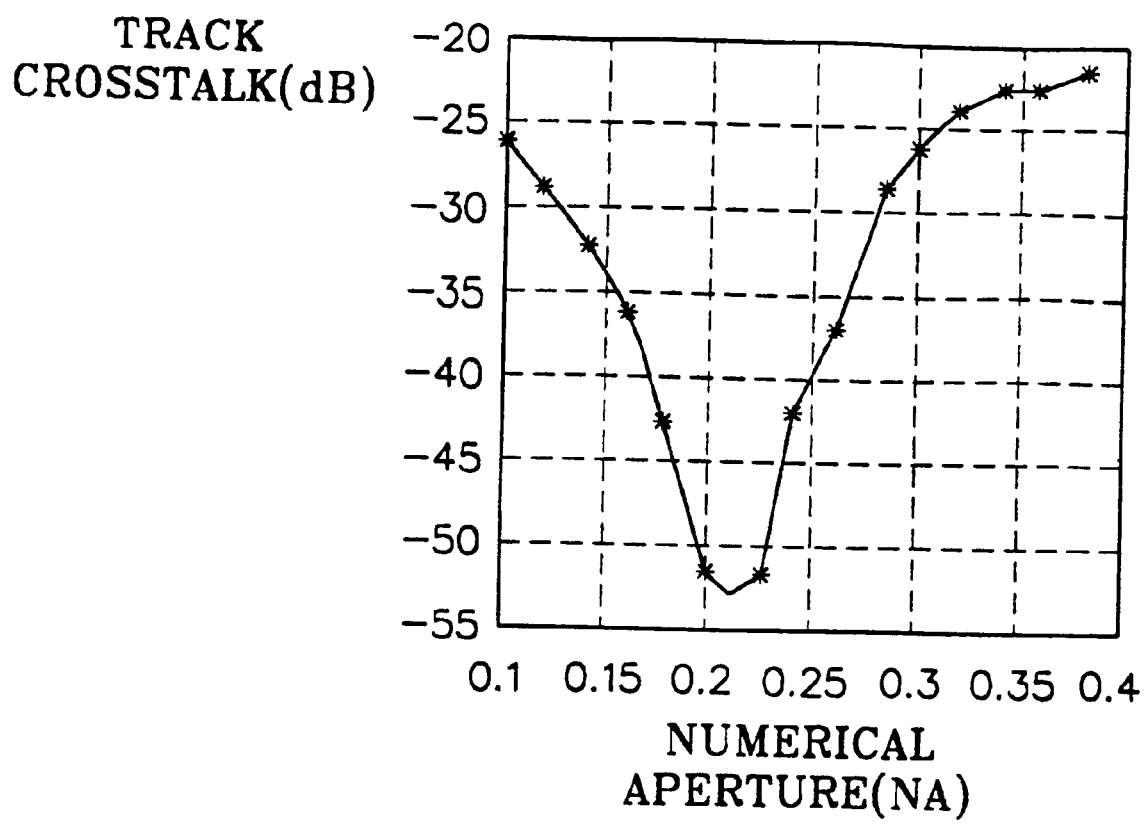
FIG. 9 is a graphical view for comparatively explaining a change in track crosstalk depending upon a change in position of the optical shielding portion having a concentric ring shape according to the first and second embodiments of the present invention, in comparison with the case that the light beam is unshielded.

FIG. 9 shows the change in the track crosstalk depending upon the change in position of the optical shielding portion having a concentric ring shape, when using the optical pickup of FIG. 4 or 6. In FIG. 9, the horizontal axis represents a numerical aperture (NA) corresponding to the inner aperture of the optical shielding portion, and the vertical axis represents track crosstalk in the case that noise is added to the light beam reflected from the target track by the adjacent tracks. The track crosstalk change curve shown in FIG. 9 is obtained by using the same specification as that used for obtaining the light intensity distribution curve indicated as a solid line in FIG. 8 and altering the diameter of the optical shielding portion while maintaining a constant width between the inner circumference and the outer circumference of the optical shielding portion having the concentric ring shape in FIG. 5 or 7. As can be seen from FIG. 9, the optical shielding portion having an inner circumferential diameter corresponding to the NA of 0.22 allows the optical pickup of FIG. 4 or 6 to generate a track crosstalk not more than −50 dB. Therefore, in the case that the optical pickup shown in FIG. 4 or 6 employs an optical shielding portion of a concentric ring shape having a width corresponding to the range of the NA from 0.22 to 0.26, a signal having a track crosstalk not more than −50 dB can be read from the optical disc. In other words, the light beam focused on and reflected from the target track has much less track crosstalk, in comparison with the case where the optical shielding portion is not used. For reference, when an optical shielding portion having the inner circumferential diameter corresponding to not less than the NA of 0.3 is used, a signal read from the optical disc 6 has a larger track crosstalk than that when an optical shielding portion is not used in the optical pickup of FIG. 4 or 6.

In the conventional art, there was an optical pickup using an annular shielding ring having the same shape as that of the concentric ring shaped optical shielding portion proposed in the present invention. This optical pickup uses an annular shielding portion formed in the position on the objective lens corresponding to the NA of 0.37, in order to correct a spherical aberration occurring when a compact disc (CD) is reproduced using an objective lens optimized to a digital versatile disc (DVD). However, in the case that the annular shielding ring disclosed in the conventional art is used, a signal read from the optical disc produces a track crosstalk not less than −30 dB as can be seen from FIG. 9. Moreover, the optical pickup of the conventional art solves an aberration problem occurring when an objective lens optimized to the DVD using the light of the wavelength of 650 nm is used for reading the CD using the light of the wavelength of 780 nm is reproduced. Therefore, the above conventional art optical pickup cannot reproduce an optical disc having narrow tracks using the light of a single wavelength.

As described above, the optical pickup for a narrow track optical disc according to the present invention focuses a single light beam on the optical disc, and uses an optical shielding portion of a predetermined size to shield part of the light beam proceeding toward the optical disc. Therefore, the light intensity of the beam spot on the target track is much larger than those at the tracks adjacent to the target track. As a result, the light beam reflected from the target track is subject to a slight interference due to the pits formed in the adjacent tracks and has a track crosstalk of an effective degree as a reproduction signal. Thus, the present invention can obtain information stored in the target track from a single light beam reflected from the target track, even in the case that a track width is further reduced in order to increase a storage capacity of an optical data storage medium. In addition, the optical pickup according to the present invention does not divide a light beam emitted from a light source into three light beams, to thereby heighten a light use efficiency. Therefore, the optical pickup according to the present invention which provides the light use efficiency can be used as an optical pickup for a recordable optical data storage medium.

As described above, the advantages of the optical pickup according to the present invention can provide an excellent performance even in the case that the optical pickup is adapted in a high-definition DVD to be commercialized in the future.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup recording and/or reproducing data with respect to an optical disc having an information recording surface with a plurality of tracks, the optical pickup comprising:

a light source to emit a light beam;

an objective lens to focus the light beam emitted from said light source on the information recording surface of the optical disc as a beam spot;

an optical detector;

optical path change means for directing the light beam emitted from said light source to said objective lens and directing a light beam reflected from the optical disc and then passed through said objective lens to said optical detector; and optical shielding means positioned on an optical path between said light source and the optical disc, for shielding part of the light beam proceeding toward the optical disc from said light source, in such a manner that light intensities of the light beam on tracks adjacent to a target track of the plurality of tracks are substantially zero in a case that the light beam is focused on the target track of the information recording surface by the objective lens.

2. The optical pickup according to claim 1, wherein said optical shielding means shields the part of the light beam proceeding toward the optical disc from said light source so that the beam spot focused on the target track has a light intensity distribution in which the light intensity on pits of the target track has a maximum value and the light intensities on pits of the adjacent tracks have a minimum value.

3. The optical pickup according to claim 1, wherein said optical shielding means is positioned on an optical path between said light source and said optical path change means.

4. The optical pickup according to claim 3, wherein said optical shielding means comprises:

a transparent substrate; and an optical shielding portion formed on said transparent substrate and having a total reflection characteristic.

5. The optical pickup according to claim 4, wherein said optical shielding portion has a concentric ring shape.

6. The optical pickup according to claim 4, wherein said optical shielding portion shields the light beam passing through the optical surface of said objective lens corresponding to a range of numerical aperture (NA) from 0.22 to 0.26, in a case that the NA corresponding to the aperture of the objective lens is 0.6 and a track pitch of the optical disc is 0.4 µm.

7. The optical pickup according to claim 4, wherein said optical shielding portion has a rectangular strip shape.

8. The optical pickup according to claim 1, wherein said optical shielding means is formed on a first optical surface of said objective lens which is positioned on an opposite side to a second optical surface of said objective lens facing the optical disc.

9. The optical pickup according to claim 8, wherein said optical shielding portion has a concentric ring shape.

10. The optical pickup according to claim 8, wherein said optical shielding means is formed on the first optical surface of said objective lens corresponding to a range of numerical aperture (NA) from 0.22 to 0.26 in a case that the NA corresponding to the aperture of said objective lens is 0.6 and a track pitch of the optical disc is 0.4 µm.

11. The optical pickup according to claim 1, wherein said optical shielding means is formed on an optical surface of said objective lens facing the optical disc.

12. The optical pickup according to claim 1, wherein said optical detector comprises a plurality of photodiodes which allow tracking and focusing using the light beam reflected from the optical disc.

13. The optical pickup according to claim 1, further comprising an optical shielding plate, wherein:

said optical path changing means is a beam splitter;

said optical shielding plate is positioned between said light source and said beam splitter; and said optical shielding means is a coating material formed on a surface of said optical shielding plate and totally reflects the part of the light beam.

14. An optical pickup for recording and/or reproducing data with respect to an optical disc having an information recording surface with a plurality of tracks, comprising:

a light source to emit a light beam;

an objective lens to focus the light beam on a target track of the plurality of tracks;

an optical detector;

a beam splitter to direct the light beam emitted from the light source to the objective lens and to direct the light beam reflected from the information recording surface and which then passes back through the objective lens to the optical detector; and an optical shielding element which shields a part of the light beam from reaching the optical disc, so that light intensities of the light beam on tracks adjacent to and contacting the target track are substantially zero as the light beam is focused by the objective lens on the target track.

15. The optical pickup according to claim 14, wherein said optical shielding element produces a light intensity distribution from a center of the target track, wherein the light intensity distribution has zero points at distances form the center of the target track which are the same as distances from the center of the target track to centers of the adjacent and contacting tracks.

16. An optical pickup to record and/or reproduce data with respect to an optical disc having an information recording surface with a plurality of tracks, the optical pickup comprising:

a light source to emit a light beam; and an optical shield positioned on an optical path between said light source and the optical disc, for shielding part of the light beam proceeding toward the optical disc from said light source, in such a manner that light intensities of the light beam on tracks adjacent to a target track of the plurality of tracks are substantially zero.

17. The optical pickup according to claim 16, further comprising an an objective lens to focus the light beam on the information recording surface of the optical disc, wherein said optical shield shields the light beam passing through an optical surface of said objective lens corresponding to a range of numerical aperture (NA) from 0.22 to 0.26, in a case that the NA corresponding to the aperture of the objective lens is 0.6 and a track pitch of the optical disc is 0.4 $\mu$m.

* * * * *